(12) United States Patent
Goldberg et al.

(10) Patent No.: US 11,057,538 B1
(45) Date of Patent: Jul. 6, 2021

(54) METHODS AND SYSTEMS FOR TAGGED-SIGNAL VERIFICATION

(71) Applicants: Boris Goldberg, Bet Shemesh (IL); Vittaly Tavor, Ramat Hasharon (IL)

(72) Inventors: Boris Goldberg, Bet Shemesh (IL); Vittaly Tavor, Ramat Hasharon (IL)

(*) Notice: Subject to any disclaimer, the term of this patent is extended or adjusted under 35 U.S.C. 154(b) by 24 days.

(21) Appl. No.: 16/731,221

(22) Filed: Dec. 31, 2019

(51) Int. Cl.
  *H04N 1/32* (2006.01)
  *H04L 9/32* (2006.01)
  *H04L 9/08* (2006.01)

(52) U.S. Cl.
  CPC ....... *H04N 1/32144* (2013.01); *H04L 9/0869* (2013.01); *H04L 9/3247* (2013.01); *H04N 2201/327* (2013.01); *H04N 2201/3226* (2013.01); *H04N 2201/3233* (2013.01)

(58) Field of Classification Search
  CPC ....... H04N 1/32144; H04N 2201/3226; H04N 2201/3233; H04N 2201/327; H04L 9/0869; H04L 9/3247
  USPC ......................................................... 382/100
  See application file for complete search history.

(56) References Cited

U.S. PATENT DOCUMENTS

| | | | | |
|---|---|---|---|---|
| 7,596,239 B2* | 9/2009 | Winger | ................. | G06T 1/0085 380/201 |
| 7,818,577 B2* | 10/2010 | David | ................... | G06T 1/0071 713/176 |
| 8,429,205 B2* | 4/2013 | Rhoads | ................... | G06F 16/48 707/809 |
| 10,148,628 B2* | 12/2018 | Chaturvedi | ........... | H04L 67/104 |
| 2006/0010430 A1* | 1/2006 | Cousot | .................... | G06F 21/16 717/127 |
| 2012/0265735 A1* | 10/2012 | McMillan | ........ | H04N 21/44204 707/687 |
| 2015/0324609 A1* | 11/2015 | Grubel | .................. | H04L 63/105 726/26 |

* cited by examiner

*Primary Examiner* — Gabriel I Garcia
(74) *Attorney, Agent, or Firm* — Reuven K. Mouallem; FlashPoint IP Ltd.

(57) ABSTRACT

The present invention discloses methods and systems for tagged-signal verification. Methods include: upon obtaining original content, generating identity and semantic signatures; superposing the identity signature on the content as an in-band digital watermark; utilizing the semantic signature by: superposing on the content or storing; transmitting a tagged signal combining watermark and content; upon receiving the tagged signal with a verification request, extracting transmitted content; extracting the watermark to retrieve a transmitted identity signature; determining the transmitted identity signature is valid by comparing to the original; obtaining the original semantic signature either by: extracting from the watermark, or retrieving a stored version; generating a transmitted semantic signature; verifying the transmitted semantic signature is identical to the original; determining the transmitted content is tamper-free and identical to the original, or has been manipulated; and transmitting a confirmation notification vouching for the authenticity as a genuine version, or designating as a tampered version.

15 Claims, 10 Drawing Sheets

Exemplary Embodiment

METHODS AND SYSTEMS FOR TAGGED-SIGNAL VERIFICATION

FIELD AND BACKGROUND OF THE INVENTION

The present invention relates to methods and systems for tagged-signal verification.

Despite the rapid pace of advancement in Internet of Things (IoT) technology, the potential threat for unauthorized access, control, and attack of such vulnerable systems has not been mitigated. In fact, the susceptibility to such unauthorized interception and/or modification of content and/or control signals has increased. With the enterprise and automotive IoT market forecasted to grow to 5.8 billion endpoints in 2020 (a 21% increase from 2019), major security threats exist.

The proliferation of IoT devices raises the issue of IoT trust. Each sensor deployed in an IoT device sends signal information at regular intervals to convey the state of the surroundings. However, sensors can behave inconsistently by transmitting incorrect signal information during the sudden breakdown of a machine, the onset of a health-related emergency, or the exposure to a malicious attack.

As an example, the so-called Man-In-The-Middle (MITM) attack aims to enable the perpetrator to breach or interrupt communication between two systems. As the attacker has access to data being communicated between the systems, the attacker can alter the data without both parties knowing it. The receiver gets the manipulated data without acknowledgement of any intrusion by the attacker in between. Moreover, sensors can suffer from their own internal problems. Signals can be lost or modified, in turn reducing the accuracy of measurements and causing errors in monitoring systems (e.g., Type I errors (false positives) and Type II errors (false negatives)).

Another vulnerability involves the so-called Deepfake technique, utilized for human image synthesis based on artificial intelligence (AI). Deepfake manipulation combines and superposes existing images and videos onto source images or videos using a machine-learning (ML) technique known as a generative adversarial network.

In order to overcome such risk exposure, establishing IoT device trust is necessary to inter alia detect device malfunction, device detachment, redirected stream transmission, device location change, obstructed device view, device hacking, and device hijacking.

In the prior art, U.S. Pat. No. 10,084,760 relates to secure messages for internet of things devices, while U.S. Pat. No. 10,178,579 relates to an IoT system and method for selecting a secondary communication channel. Both patents relate to using stream encryption for a network communication protocol as a security measure for providing confidential data exchange among entities. Such encryption techniques encounter limitations such as: (1) devices can still be repositioned, screened, detached or hacked; (2) the data stream may be replaced with data coming from a different source; and (3) the data stream may be replaced with a historical data sample.

Besides encryption, U.S. Pat. No. 10,178,579 uses an additional channel to provide a comparison mechanism via channel redundancy (i.e., adding more devices to compare the outputs). However, such redundancy significantly increases the inherent cost of such installations. Such techniques are also possible to add redundant devices/signals with majority voting mechanisms. Limitations of channel/device redundancy are the same as those outlined above regarding encryption. In addition, the malfunction of one of the devices may produce a large number of false positives.

Other techniques involve using AI/ML methods to improve the accuracy of predicting events, detect anomalies from IoT sensors, and trigger alarms. Such methods suffer from their latent delayed reactivity in that such implementations can't provide real-time detection. Moreover, a hacker who knows the ML algorithm being deployed can adjust the output in such way that the algorithm will recognize the output as legitimate.

With the transmission of voice/audio data, techniques employed include speech encryption in a hybrid peer-to-peer network (see U.S. Pat. No. 10,148,628). Other methods involve signing voice/audio data with some kind of digital watermark (see U.S. Pat. No. 6,785,815 for methods and systems for encoding and protecting data using digital signature and watermarking techniques, U.S. Pat. No. 8,429,205 for associating data with media signals in media signal systems through auxiliary data steganographically embedded in the media signals, and KR Patent Publication No. 2019/0038713).

Such techniques aim to enhance copyright protection and complicate fraud attempts during digital object creation by means of adding secondary encrypted steganographic data into media content. Limitations of such methods include: requiring special device/application for playing content due to file structure modification, not preventing modification of the actual audio signal, and not working with online speech deepfakes.

With the transmission of image/video data, techniques employed include digital watermarking (see U.S. Pat. No. 7,596,239 for method and/or apparatus for video watermarking and steganography using simulated film grain, and PCT Patent Publication No. WO2002/003328 for steganographic embedding of data in digital signals). Limitations of such methods are similar to the ones described above regarding voice/audio data.

It would be desirable to have methods and systems for tagged-signal verification. Such methods and systems would, inter alia, overcome the various limitations mentioned above.

SUMMARY

It is the purpose of the present invention to provide methods and systems for tagged-signal verification.

It is noted that the term "exemplary" is used herein to refer to examples of embodiments and/or implementations, and is not meant to necessarily convey a more-desirable use-case. Similarly, the terms "alternative" and "alternatively" are used herein to refer to an example out of an assortment of contemplated embodiments and/or implementations, and is not meant to necessarily convey a more-desirable use-case. Therefore, it is understood from the above that "exemplary" and "alternative" may be applied herein to multiple embodiments and/or implementations. Various combinations of such alternative and/or exemplary embodiments are also contemplated herein.

Device hijacking is increasingly a concern with the proliferation of IoT devices. The security challenges created by deepfake technology and relay hijacking have caused it to be ever more important to authenticate not only the device itself, but to validate the signal produced by the device. Existing authentication methods either rely on the authentication of a device itself (e.g., a private certificate for the device), or bulk signing of the device signal on a device itself.

Embodiments of the present invention provide an in-band authentication factor with a semantic signature. A provided external signal (read by a device) is added as an in-band part of the signal generated by the device itself. The external signal combines at least two separate independent information items: (1) a source identity (i.e., either a device or a caller) with a timestamp and (2) a signature of the semantic content. The semantic signature doesn't have to be present in the signal; it may be stored in a database, and extracted based on the timestamp and the source identity.

The external signal is not generated by the device itself, but rather by an external source (i.e., a new, in-band, externally-generated signal). The external signal (e.g., independently generated by a cloud service) is superposed on the device input signal. As an example, if the device is a camera, the external signal may be a group of LEDs displaying a light pattern. If the device is an audio sensor, the external signal may be an additional audio source (e.g., a mobile phone) generating a high-frequency sound. In other cases, the external signal may be an additional bitstream introduced through a separate channel (e.g., an additional Bluetooth input to an existing sensor).

The resulting combined signal (containing the superposed external signal with the additional external content) produced by the device is then verified for the existence of the external signal, analyzed semantically, and the semantic representation of the signal is signed. Semantic representation may inter alia be the transcript of an audio session, the text of a speaker's oration, the presence of specific people or objects in an image/video, and the presence in specific objects or reflections in an image/video. The signatures are stored in the data stream. However, the actual semantic descriptions are stored externally from the sender/receiver (e.g., within a cloud service).

When the input is received by a receiver, it is also sent for external verification (e.g., within a cloud service). The verification process checks for the existence of the external signal (e.g., LED or high-frequency audio signal), and uses the external signal to obtain the semantic signal checksums. The received signal is then analyzed in the same way as when it was generated, and semantic checksums are compared with the externally-stored checksums. If checksums are found not to match, the device signal is considered potentially tainted by signal tampering.

Such embodiments of the present invention enable verification that: live data is originating from the correct location, a device is not malfunctioning, and/or a device signal contains the expected in-band signature.

Other embodiments of the present invention enable the determination of the genuineness of audio signals. Use cases for such capability include detecting whether: (1) a voice message has been shortened, edited, and/or modified (e.g., additional statements, words, or exclamations); (2) a voice is authentic or fake; and (3) a voice-activated appliance (e.g., AWS Alexa) is encountering a remote-activation attempt via a laser-pulse stream mimicking a voice, as recently reported. In the third scenario, an even a simpler hacking scheme would be to replay a synthesized voice message to a voice-activated appliance. Such embodiments verify that the voice data is genuine and tamper-free.

Other embodiments of the present invention enable the determination of the genuineness of image/video source signal (either live or historical). Use cases for such capability include detecting whether: (1) new personas have been added to the source content; (2) different text or emotions have been superposed/embedded/integrated into personas of the source content; (3) the location or background environment of the source content has been modified; and (4) the timestamp of the source content has been modified. Such embodiments verify that the source content has not been deepfaked.

Therefore, according to the present invention, there is provided for the first time a method for tagged-signal verification, the method including the steps of: (a) upon obtaining original content to be transmitted to a recipient device in verified form, generating an original identity signature for the original content; (b) generating an original semantic signature for the original content; (c) superposing the original identity signature on the original content as an in-band digital watermark; (d) utilizing the original semantic signature either by: (i) superposing the original semantic signature on the original content as part of the in-band digital watermark; or (ii) storing the original semantic signature for verification; (e) transmitting a tagged signal, wherein the tagged signal is a combined signal of the in-band digital watermark and the original content; (f) upon receiving the tagged signal from the recipient device with a verification request, extracting transmitted content from the tagged signal; (g) extracting the in-band digital watermark from the tagged signal to retrieve a transmitted identity signature; (h) determining whether the transmitted identity signature is valid by comparing the transmitted identity signature to the original identity signature; (i) obtaining the original semantic signature either by: (i) extracting the original semantic signature from the in-band digital watermark; or (ii) retrieving a stored version of the original semantic signature; (j) generating a transmitted semantic signature from the transmitted content; (k) verifying whether the transmitted semantic signature is identical to the original semantic signature; (l) determining whether the transmitted content is tamper-free and identical to the original content, or has been manipulated based on the step of verifying; and (m) transmitting a confirmation notification to the recipient device, wherein the confirmation notification is adapted to: (i) vouch for the authenticity of the transmitted content as a genuine version of the original content; or (ii) designate the transmitted content as a tampered version of the original content.

Alternatively, the step of superposing is performed by at least one in-band signature actuator configured to emit the in-band digital watermark as at least one specific identifiable sequence.

Most alternatively, at least one in-band signature actuator is at least one item selected from the group consisting of: a light emitter, a loudspeaker, a vibrating component, a controllable motion component, a sequence-displaying device, and a sensor-detectable sequence generator, and wherein at least one specific identifiable sequence is at least one item selected from the group consisting of: a sequenced flashing light, a sequenced color-changing light, a sequenced audio signal, a sequenced vibration pattern, and a sequenced motion pattern.

Alternatively, the semantic signature is based on a speech recognition, a text conversion, an image analysis, an audio analysis, and/or a pattern analysis on the original content.

According to the present invention, there is provided for the first time a system for tagged-signal verification, the system including: (a) a CPU for performing computational operations; (b) a memory module for storing data; (c) a network connection for communicating across a network; and (d) a signing/verification module configured for signing and verifying original content to be transmitted to a recipient device in verified form, the signing/verification module including: (i) an identity signature generator configured for: (A) generating an original identity signature for the original content; and (B) superposing the original identity signature on the original content as an in-band digital watermark; (ii) a semantic signature generator configured for: (A) generating an original semantic signature for the original content; and (B) utilizing the original semantic signature either by: (I) superposing the original semantic signature on the original content as part of the in-band digital watermark; or (II) storing the original semantic signature by the memory module for verification; (iii) an original content extractor configured for, upon receiving a tagged signal from the recipient device with a verification request, extracting transmitted content from the tagged signal, wherein the tagged signal is a combined signal of the in-band digital watermark and the original content, and wherein the tagged signal is transmitted by the network connection; (iv) an in-band signature extractor configured for: (A) extracting the in-band digital watermark from the tagged signal to retrieve a transmitted identity signature; and/or (B) extracting the original semantic signature from the in-band digital watermark; (v) a signature comparator configured for: (A) determining whether the transmitted identity signature is valid by comparing the transmitted identity signature to the original identity signature; (B) obtaining the original semantic signature either by extracting by the in-band signature extractor or by retrieving a stored version from the memory module; (C) verifying whether a transmitted semantic signature is identical to the original semantic signature, wherein the transmitted semantic signature is generated from the transmitted content by the semantic signature generator; and (D) determining whether the transmitted content is tamper-free and identical to the original content, or has been manipulated based on the verifying; and (vi) an alert notifier configured for transmitting, via the network connection, a confirmation notification to the recipient device, wherein the confirmation notification is adapted to: (A) vouch for the authenticity of the transmitted content as a genuine version of the original content; or (B) designate the transmitted content as a tampered version of the original content.

Alternatively, the system further including: (vii) at least one in-band signature actuator configured for performing the superposing by emitting the in-band digital watermark as at least one specific identifiable sequence.

Most alternatively, at least one in-band signature actuator is at least one item selected from the group consisting of: a light emitter, a loudspeaker, a vibrating component, a controllable motion component, a sequence-displaying device, and a sensor-detectable sequence generator, and wherein at least one specific identifiable sequence is at least one item selected from the group consisting of: a sequenced flashing light, a sequenced color-changing light, a sequenced audio signal, a sequenced vibration pattern, and a sequenced motion pattern.

Alternatively, the memory module includes a configuration storage unit for storing configuration data, user profile data, and/or signature data.

Alternatively, the network connection includes at least one secure channel for restricted secure communication.

Alternatively, the identity signature generator includes functionality for performing encryption, decryption, and/or hashing.

Alternatively, the semantic signature generator includes functionality for performing encryption, decryption, hashing, speech recognition, text conversion, image analysis, audio analysis, and/or pattern analysis on the original content.

According to the present invention, there is provided for the first time a non-transitory computer-readable storage medium, having computer-readable code embodied on the non-transitory computer-readable storage medium, for tagged-signal verification, the computer-readable code including: (a) program code for, upon obtaining original content to be transmitted to a recipient device in verified form, generating an original identity signature for the original content; (b) program code for generating an original semantic signature for the original content; (c) program code for superposing the original identity signature on the original content as an in-band digital watermark; (d) program code for utilizing the original semantic signature either by: (i) superposing the original semantic signature on the original content as part of the in-band digital watermark; or (ii) storing the original semantic signature for verification; (e) program code for transmitting a tagged signal, wherein the tagged signal is a combined signal of the in-band digital watermark and the original content; (f) program code for, upon receiving the tagged signal from the recipient device with a verification request, extracting transmitted content from the tagged signal; (g) program code for extracting the in-band digital watermark from the tagged signal to retrieve a transmitted identity signature; (h) program code for determining whether the transmitted identity signature is valid by comparing the transmitted identity signature to the original identity signature; (i) program code for obtaining the original semantic signature either by: (i) extracting the original semantic signature from the in-band digital watermark; or (ii) retrieving a stored version of the original semantic signature; (j) program code for generating a transmitted semantic signature from the transmitted content; (k) program code for verifying whether the transmitted semantic signature is identical to the original semantic signature; (l) program code for determining whether the transmitted content is tamper-free and identical to the original content, or has been manipulated based on the verifying; and (m) program code for transmitting a confirmation notification to the recipient device, wherein the confirmation notification is adapted to: (i) vouch for the authenticity of the transmitted content as a genuine version of the original content; or (ii) designate the transmitted content as a tampered version of the original content.

Alternatively, the superposing is performed by at least one in-band signature actuator configured to emit the in-band digital watermark as at least one specific identifiable sequence.

Most alternatively, at least one in-band signature actuator is at least one item selected from the group consisting of: a light emitter, a loudspeaker, a vibrating component, a controllable motion component, a sequence-displaying device, and a sensor-detectable sequence generator, and wherein at least one specific identifiable sequence is at least one item selected from the group consisting of: a sequenced flashing light, a sequenced color-changing light, a sequenced audio signal, a sequenced vibration pattern, and a sequenced motion pattern.

Alternatively, the semantic signature is based on a speech recognition, a text conversion, an image analysis, an audio analysis, and/or a pattern analysis on the original content.

These and further embodiments will be apparent from the detailed description and examples that follow.

BRIEF DESCRIPTION OF THE DRAWINGS

The present invention is herein described, by way of example only, with reference to the accompanying drawings, wherein.

DESCRIPTION OF THE ILLUSTRATIVE EMBODIMENTS

The present invention relates to methods and systems for tagged-signal verification. The principles and operation for providing such methods and systems, according to the present invention, may be better understood with reference to the accompanying description and the drawings.

Consider the use case for verifying a stationary device location and proper device operation. The verification requires verifying that a transmitted signal coming from a sensor/device is originating from the correct location, and the sensor/device is not malfunctioning. A tag signal is added to the transmitted signal, received by a properly-functioning sensor/device in addition to the transmitted signal, and delivered in-band to the external monitoring system. Such a technique permits verification of the genuineness of the received stream by detecting the expected tag signal in the actual received stream. The received stream is verified (i.e., authenticated, considered genuine, and/or verified as genuine) if the transmitted signal includes the superposed tag signal. For simplicity, the combined transmitted signal and tag signal is hereinafter referred to as a tagged signal. Implementations can be employed with virtually any kind of sensor (e.g., a camera, a microphone, a motion detector, a temperature sensor, and a light sensor) to help to detect both malfunctioning and compromised detectors/sensors/devices.

Figure 1:
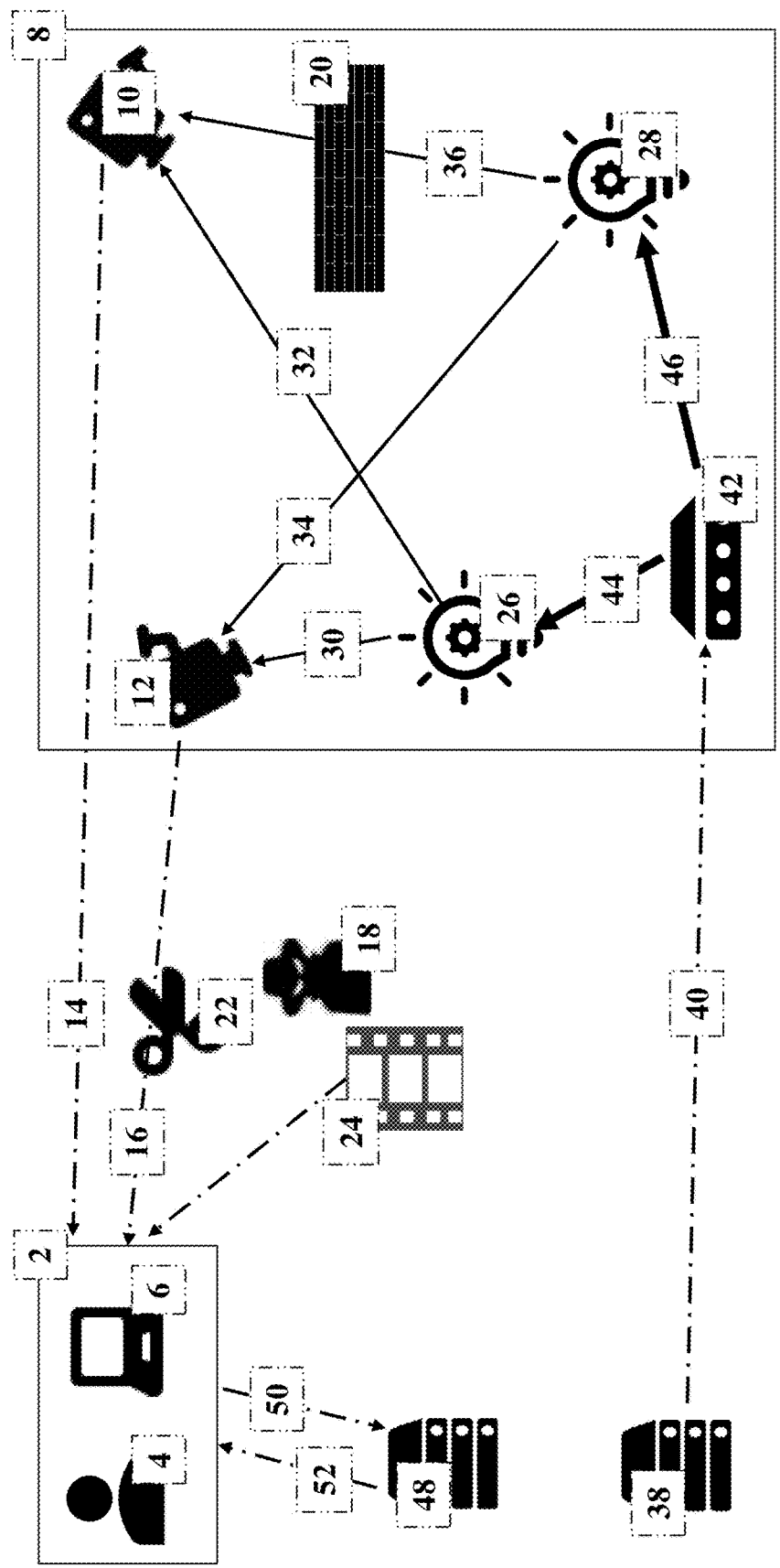
FIG. 1 is a simplified high-level schematic diagram of the system architecture for tagged-signal verification of IoT devices, according to embodiments of the present invention.

Referring to the drawings, FIG. 1 is a simplified high-level schematic diagram of the system architecture for tagged-signal verification of IoT devices, according to embodiments of the present invention. The use case could be a security area, which is monitored by surveillance cameras. A control center 2 with an operator 4 monitors on a console 6 the status of a secure remote location 8. Two partially-overlapping video streams are being monitored by cameras 10 and 12. Normally the signal is delivered to console 6 via data streams 14 and 16. However, an intruder 18 may interfere either by screening the video stream using an obstruction 20, by cutting 22 data stream 16, and/or by redirecting a faked or prerecorded stream 24 to console 6 in place of data streams 14 and 16.

To mitigate and prevent such a security attack, secure remote location 8 is equipped with supplementary active devices 26 and 28 (e.g., LEDs), which emit unique sequences of flashes 30, 32, 34, and 36 for encoding specific identifiable sequences. Flashes 30, 32, 34, and 36 are generated by a configuration system 38 via sequence control signal 40, and are delivered to supplementary active devices 26 and 28 by means of an optional concentrator 42 via flash control signals 44 and 46. Each sequence uniquely identifies supplementary active devices 26 and 28 and their locations. Under normal circumstances, such sequences are detected by control center 2 as part of the signal received from both cameras 10 and 12.

A verification system 48 receives a duplicate stream 50 of data streams 14 and 16, separates the sequences from the rest of the video content, and verifies that the sequences are valid. Any kind of violation (e.g., a missing sequence, a wrong or outdated code, and a discrepancy between signals) triggers an alarm 52 propagated to console 6.

Figure 2:
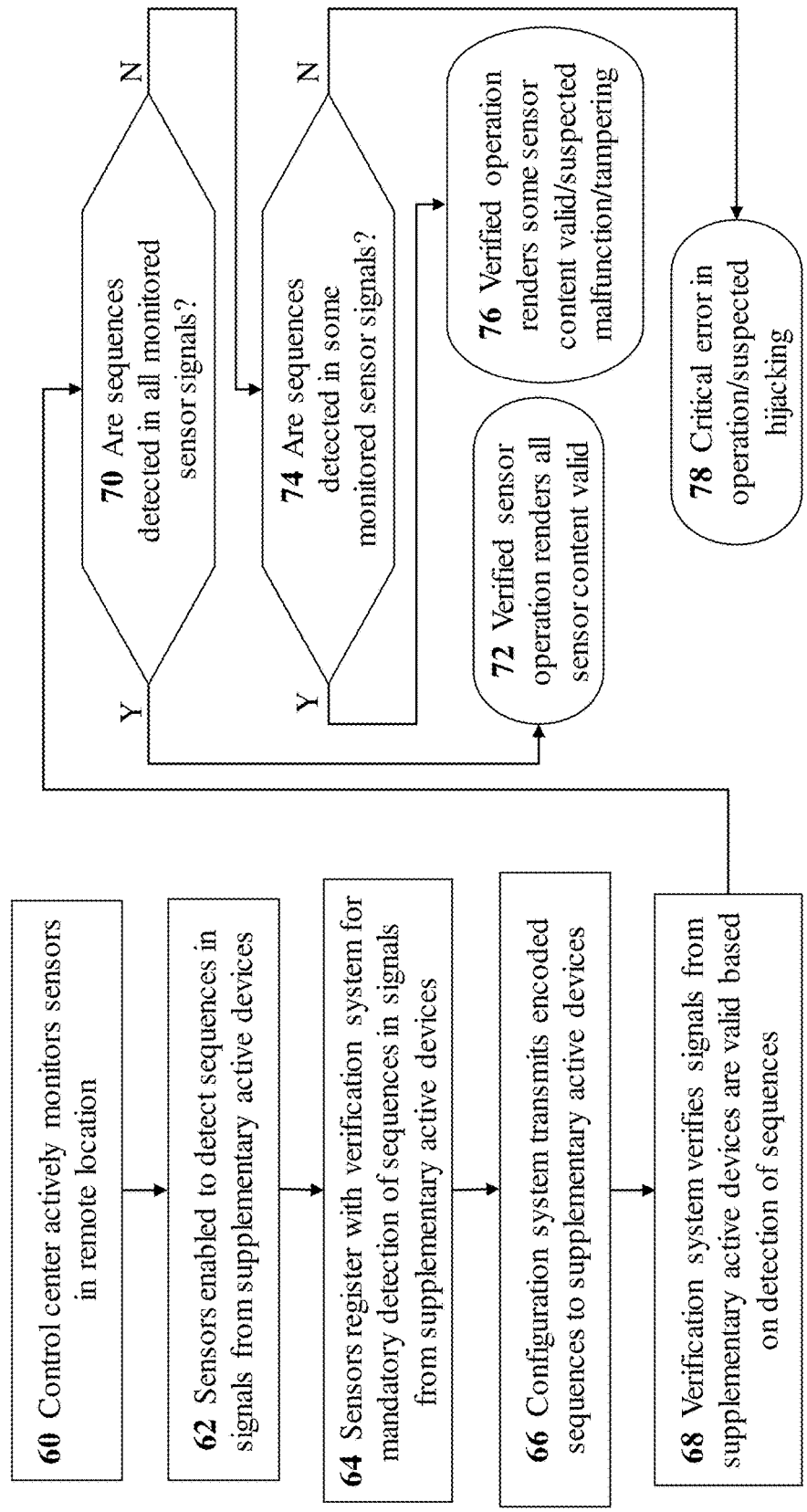
FIG. 2 is a simplified flowchart of the major process steps for tagged-signal verification as depicted in FIG. 1, according to embodiments of the present invention.

FIG. 2 is a simplified flowchart of the major process steps for tagged-signal verification as depicted in FIG. 1, according to embodiments of the present invention. The process starts with control center 2 actively monitoring sensors in remote location 8 (Step 60). The sensors are enabled to detect sequences in signals from supplementary active devices (Step 62). Sensors register with verification system 48 for mandatory detection of sequences in signals from supplementary active devices (Step 64). Configuration system 38 transmits encoded sequences to the supplementary active devices (Step 66).

Verification system 48 verifies that signals from the supplementary active devices are valid based on the detection of the sequences in the signals (Step 68). Verification system 48 determines whether the sequences are detected in all the monitored sensor signals (Step 70). If so, sensor operation is verified, rendering all sensor content valid (Step 72). If not, verification system 48 determines whether the sequences are detected in some of the monitored sensor signals (Step 74). If so, sensor operation is partially verified, rendering some sensor content valid, while also flagging suspected sensor malfunction/tampering (Step 76). If not, verification system 48 triggers an alarm due to a critical error in operation and/or suspected sensor hijacking (Step 78).

Implementations of the technique above can employ various communication components. For example, the control center having a central management system can connect to gateways via the Internet and/or a cellular network. The supplementary active devices can be low-cost devices with limited onboard logic to receive commands from intermediate gateways, and broadcast the identity of supplementary active devices via the Internet, for example. Such intermediate gateways are enabled to discover of supplementary active devices in their proximity, report device topology to the central management system via Internet and/or cell communication, and receive reporting plan for each controlled supplementary active device.

The primary devices that are monitoring the location are typically passive devices (e.g., cameras, microphones, and motion detectors). Supplementary active devices are paired with passive monitoring devices, and can include numerous types of devices with suitable output signals (e.g., loudspeakers, flashing lights, multicolor lights, and/or vibrating components). Intermediate gateways can be installed in the monitored location as well for collecting device identifiers (e.g., IP address, MAC address, and/or serial number) from surrounding supplementary active devices, which are reported to the central management system.

In such implementations, the central management system transmits a unique sequence signal to each supplementary active device which is assigned to a single intermediate gateway, and uses the information to configure the intermediate gateways. During data monitoring and collection, the intermediate gateways send command signals to each supplementary active device using the device's unique sequence, causing sequence of actions (e.g., beeps, flashes, color bursts, and light bursts). Once captured by the passive monitoring devices, and transmitted via conventional IoT gateways to an IoT hub (in-band, not out-of-band, communication).

The signal from each passive monitoring device is analyzed, with the sequence of actions being detected and decoded. In a multi-device installation having numerous IoT devices being monitored, there can be a dynamic "many-to-many" interaction among devices evolving over time (e.g., a camera that is scanning a sector, a camera zooming in on a region, and a camera having its position changed by a drone). After initial configuration/reconfiguration, the central management system stores an existing device mapping as a baseline reference in order to determine if an alarm needs to be triggered upon detecting any device violation.

In embodiments for determining the genuineness of audio stream data (e.g., a telephone signal and mp3 recording), meaning whether the data is unmodified and belongs to an authenticated person, in-band digital watermarks (IBDW) of two types are added to the data. The first type (IBDW1) is transmitted periodically (e.g., every 3-5 seconds) to identify the persona, while parsing speech in the audio stream into distinct segments. Each speech segment is transcribed to text that is digitally signed. The digital signature of the text segments is transmitted as IBDW2 (the second type of watermark) between IBDW1 transmission, thus signing the previous segment. Such embodiments enable the verification of an authenticated persona, the transmittal time, and the actual content for either live or recorded media.

Figure 3:
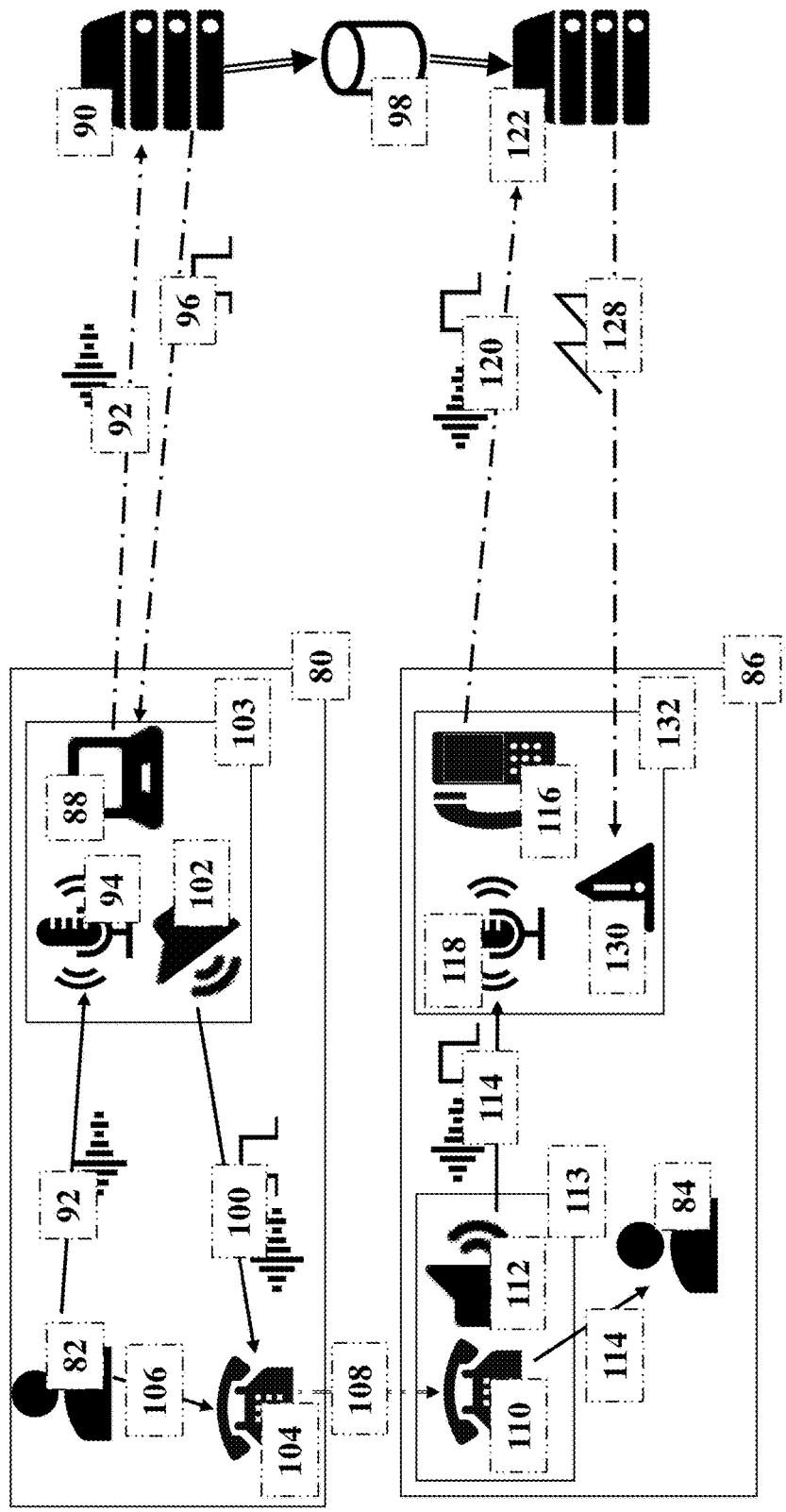
FIG. 3 is a simplified high-level schematic diagram of the system architecture for tagged-signal verification of audio stream data, according to embodiments of the present invention.

FIG. 3 is a simplified high-level schematic diagram of the system architecture for tagged-signal verification of audio stream data, according to embodiments of the present invention. A signer location 80 having a caller 82 decides to initiate a verified conversation (e.g., over a cellular network, a VOIP line, or a legacy PSTN line) with a recipient 84 in a consumer location 86. If the conversation is recorded, caller 82 wants to ensure that the speech is not tampered with.

Caller 82 activates an application on a smart device 88 (e.g., PC, laptop, or phone), which authenticates caller 82, and contacts a signing system 90. Signing system 90 locates the personalized metadata of caller 82 including unique keys. Call content 92 is detected by a microphone 94, and transmitted over a channel to signing system 90, which transcribes call content 92, and signs the transcribed content. A resultant digital signature 96 is returned over a channel (which may be identical to channel the one used to transmit call content 92) to application on smart device 88, which encodes the caller signature in a high-frequency audio pattern 100 emitted by speaker 102. Alternatively, resultant digital signature 96 is not transmitted, but rather kept in a database 98 in signing system 90 for future verification.

High-frequency audio pattern 100 is embedded by a caller phone 104 (e.g., a legacy phone), and transmitted in-band with the natural conversation of caller 82, depicted as call content 106. It is understood that components 103 (i.e., smart device 88, microphone 94, and speaker 102), as well as caller phone 104, can be embodied in a single device. A tagged signal 108 having the combined audio signals of caller content 106 and high-frequency audio pattern 100 is transmitted over a PSTN line to a recipient phone 110 having a speaker 112 to provide recipient content 114 to recipient 84. It is understood that components 113 (i.e., recipient phone 110 and speaker 112) can be embodied in a single device.

Recipient 84 may launch a verification application on a smart device 116, and activate speaker mode on recipient phone 110 in order for smart device 116 to receive recipient content 114 as well via a microphone 118. Smart device 116 transmits recipient content 114 through a channel 120 to a verification system 122, which separates the audio received from channel 120 into high-frequency audio pattern 100 and caller content 106 (e.g., via a high-pass filter). Caller content 106 is then processed in the same way as by signing system 90—the speech is transcribed, and a speech signature is detected and compared to the caller signature. A signature comparison result 128 is transmitted as a verification approval or an alarm trigger, and is transmitted to recipient 84 as a notification/alarm 130 on smart device 116.

It is understood that components 132 (i.e., smart device 116, and microphone 118, and notification/alarm 130), as well as components 113, can be embodied in a single device. It is noted that verification system 122 can be the same system as signing system 90, performing both system functions. It is further noted that the purpose of database 98 is to store semantic information and other additional metadata. For example, if the in-band signal contains only a timestamp and a caller ID, database 98 may store the actual signature of the outgoing signal. Then, when verification system 122 verifies the call, it receives the caller ID and the timestamp from the stream, but the content signature from database 98.

Figure 4:
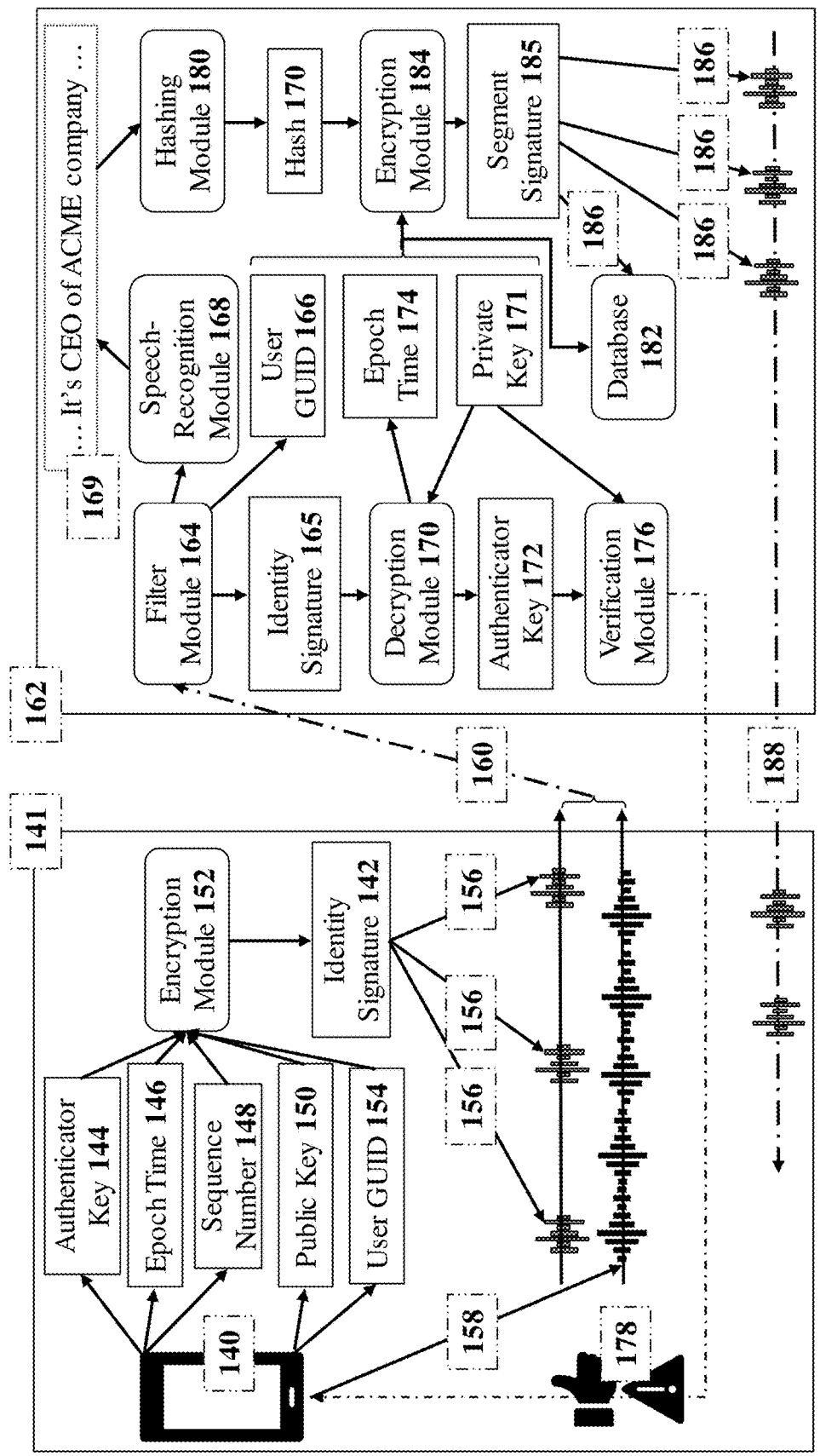
FIG. 4 is a simplified high-level schematic diagram of the signing process for the verification application and signing system of FIG. 3, according to embodiments of the present invention.

FIG. 4 is a simplified high-level schematic diagram of the signing process for the verification application and signing system of FIG. 3, according to embodiments of the present invention. Every N seconds (configurable, typically 3-4 sec.), a verification application on a smart device 140 (e.g., smart device 88 of FIG. 3) in a signer location 141 generates a digital identity signature 142 from the following components (which reside on smart device 140, and are depicted in FIG. 4 as functional block elements and/or representative signals).

When the user of smart device 140 registers through the verification application, a secret key is provided. A unique authenticator key 144 is then generated as a one-time password (similar to Google authenticator keys generated for two-factor authentication). Authenticator key 144 is based on an epoch time 146 in seconds and the secret key, and is combined with a sequence number 148, and encrypted with a public key 150 via an encryption module 152. Public key 150 is readily available through the verification application, and is not unique to any user. During registration, the user is assigned two unique values: a public unique user GUID 154 (e.g. a base-16 string) identifying the user and the private unique secret key, used in generating authenticator key 144.

Digital identity signature 142 (e.g., about 50 bytes of data with an expected duration of about 2-2.5 sec.) can be encoded into signature watermarks 156 (e.g., using a Fourier transform of a composite of 16 acoustic-range frequencies or tones to match GUID 154), which are merged with an original voice signal 158, and transmitted via a channel 160 to a signing system 162 (e.g., signing system 90 of FIG. 3).

Signing system 162 uses a filter module 164 to separate an identity signature 165 and a user GUID 166 from original voice signal 158, and process original voice signal 158 through a speech-recognition module 168 to convert the speech into text content, which is parsed into speech segments 169 between every pair of signature watermarks 156. A decryption module 170 decrypts identity signature 165 using a private key 171, and extracts authenticator key 172 (which is identical to authenticator key 144) and epoch time 174 (which is identical to epoch time 146).

A verification module 176 then verifies authenticator key 172 using user GUID 166, epoch time 174, and private key 171 stored in the database. If authenticator key 172 is found to be incorrect, an alert 178 is transmitted to smart device 140. If authenticator key 172 is correct, then speech-recognition module 168 converts original voice signal 158 into text which is parsed into speech segments 169.

For each speech segments 169, a hashing module 180 converts the text into a hash 181 (e.g., MD5). User GUID 166, epoch time 174, and hash 181 are optionally stored in a database 182. Alternatively, user GUID 166, epoch time 174, private key 171, and hash 181 are then encrypted via an encryption module 184 into a segment signature 185 (e.g., about 25 bytes of data with an expected duration of about 0.6-1 sec.). Segment signature 185 can be converted into a high-frequency audio signal, and encoded into segment watermarks 186 similar to signature watermarks 156, which are transmitted via a channel 188 to the verification application, and merged with original voice signal 158 and identity signature 142 in smart device 140. Alternatively, segment watermarks 186 are not transmitted, but rather kept in a database 182 in signing system 162 for future verification.

Figure 5:
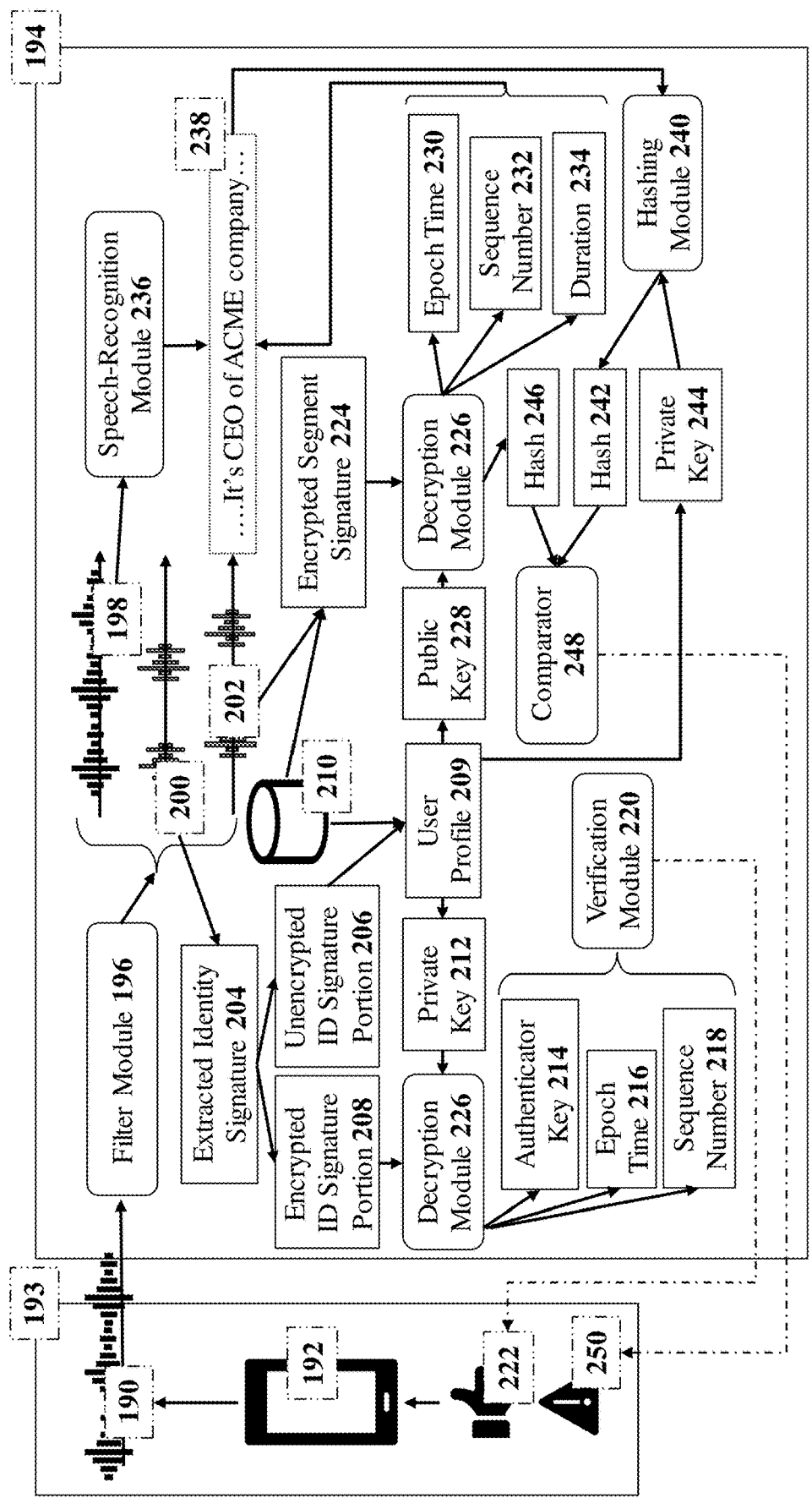
FIG. 5 is a simplified high-level schematic diagram of the signing process for verification system of FIG. 3 (lower half), according to embodiments of the present invention.

FIG. 5 is a simplified high-level schematic diagram of the signing process for verification system of FIG. 3 (lower half), according to embodiments of the present invention. A tagged signal 190 containing the unified audio stream of the original conversation (e.g., original voice signal 158 of FIG. 4) and two type of digital watermarks (e.g., identity signature 142 and segment signature 185 of FIG. 4) is transmitted from the verification application on smart device 192 in consumer location 193 to verification system 194 (e.g., verification system 122 of FIG. 3), depicted in FIG. 5 as functional block elements and/or representative signals residing on smart device 192 in consumer location 193 and/or in verification system 194.

Verification system 194 separates tagged signal 190 using a filter module 196 to extract three distinct streams: an original voice signal 198, an identity signature 200, and optionally a segment signature 202. An extracted identity signature 204 is split into an unencrypted ID-signature portion 206 (e.g., GUID 154 of FIG. 4) and an encrypted ID-signature portion 208. Verification system 194 accesses a user profile 209 associated with unencrypted ID-signature portion 206 from a configuration database 210. User profile 209 includes two pairs of public/private keys and the authentication sequence. Public/private keys are not user-specific. Smart device 192 always encrypts/decrypts with a public key, while verification system 194 always uses its private keys.

Using a private key 212, encrypted ID-signature portion 208 is decrypted via a decryption module 226, and its components are extracted into an authenticator key 214, an epoch time 216, and a sequence number 218. All these components are verified against profile settings (i.e., valid authenticator key 214) and previous identity signature variables (i.e., epoch time 216 and sequence number 218) via a verification module 220 to produce verified results 222. Verified results 222 are transmitted to smart device 192 (either in-band or out-of-band). An encrypted segment signature 224 is extracted from segment signature 202. Alternatively, encrypted segment signature 224 is extracted from configuration database 210 based on identity signature 200 and epoch time 216.

Decryption module 226 (depicted twice in FIG. 5 for clearer schematic flow) decrypts encrypted segment signature 224 with a public key 228, and extracts its components into a segment-start epoch time 230, a sequence number 232, and a segment duration 234. The speech is transcribed via a speech-recognition module 236 into text content, and parsed into speech segments 238 according to segments durations 234. For each speech segment 238, a hashing module 240 creates a hash 242 using a private key 244. Hash 242 is compared with a hash 246 derived from segment signature 224. A comparator 248 (which can be the same as verification module 220) produces a hash comparison result 250 which is transmitted to smart device 192 (out-of-band). As in FIG. 4, there are two use cases for the segment signature: embedded in the data stream, or stored in configuration database 210. Thus, hash 242 may be obtained either by decrypting the hash from embedded segment signature 224 embedded in the data stream, or by retrieving the hash from configuration database 210.

The procedure described above for the tagged-signal verification system requires the user to initialize the verification application during preliminary registration. The user is required to prove his/her identity via a third-party identity management service. The user must provide photographs of their persona (e.g., 4-5 photos) and a sample of voice speech (e.g., 2 minutes). Once the credentials have been provided, the user receives a digital identity. A public/private key pair is generated, with the public key delivered to the user's verification application. The system performs a training session during initial configuration to identify the user's face and to transcribe the user's voice to text.

In embodiments for determining the genuineness of voice data for voice-activated personal digital assistants (e.g., AWS Alexa, Apple Ski, and Microsoft Cortana), an additional authentication factor is added using in-band digitals identity watermarks (e.g., transmitted every 3-5 seconds) in order to identify the persona of the detected voice. An unobtrusive digital signature (e.g., ultrasound tones or whistles) is encoded to serve as a second authentication factor. To prevent "replay" attack, in addition to personal identity, the digital signature contains the transmission time and a unique authorization sequence.

Figure 6:
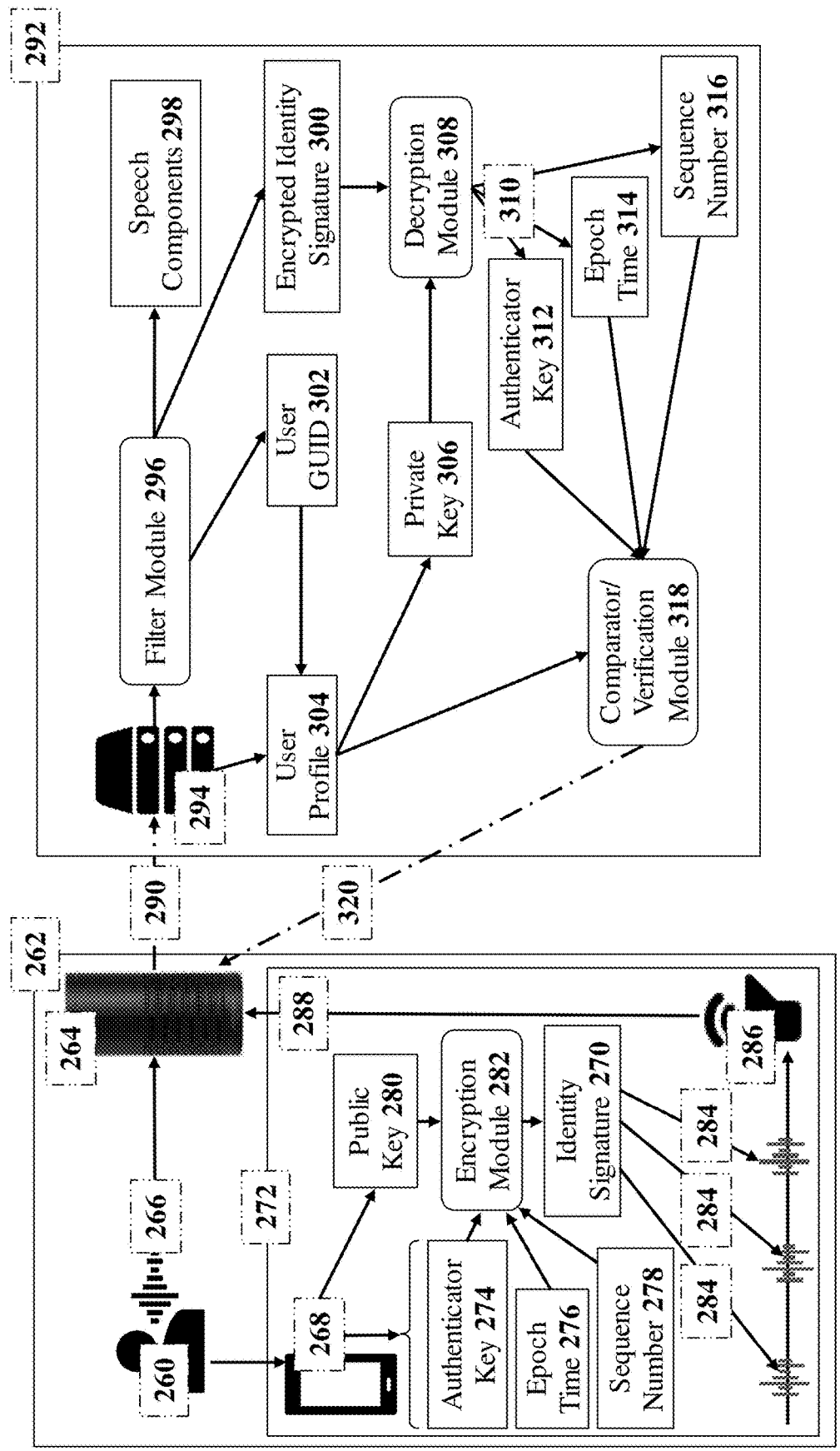
FIG. 6 is a simplified high-level schematic diagram of the system architecture for tagged-signal verification of voice data for voice-activated personal digital assistants, according to embodiments of the present invention.

FIG. 6 is a simplified high-level schematic diagram of the system architecture for tagged-signal verification of voice data for voice-activated personal digital assistants, according to embodiments of the present invention. A user 260 in a home location 262 is communicating with a voice-activated Personal Digital Assistant (PDA) 264. User 260 wants to use two-factor authentication for providing a voice command 266, and activates a verification application on a smart device 268. Operation of the verification application is similar to operation described above with regard to FIGS. 3-5.

A digital identity signature 270 is periodically generated (e.g., every 3-4 seconds) by the verification application from device components 272 on smart device 268. A unique authenticator key 274 is combined with an epoch time 276 in seconds and a sequence number 278, and encrypted with a public key 280 via an encryption module 282. Public key 280 is assigned to the owner of verification application during registration together with a unique user GUID. The actual transmitted signal always contains an unencrypted GUID and an encrypted identity signature.

Digital identity signature 270 (e.g., about 50 bytes of data with an expected duration of about 2-2.5 sec.) can be encoded into signature watermarks 284 (e.g., as in signature watermarks 156 above with regard to FIG. 4), which are played through a speaker 286. A tone sequence 288 is detected by voice-activated PDA 264, and transmitted via a channel 290 to a verification system 292 having a verification server 294.

A filter module 296 separates speech component 298 from the digital signature, and extracts an encrypted identity signature 300 and a unique user GUID 302. User GUID 302 enables verification system 292 to access a user profile 304 and a private key 306. Using private key 306, a decryption module 308 decrypts digital signature components 310: an authenticator key 312, an epoch time 314, and a sequence number 316. A comparator/verification module 318 compares digital signature components 310 with user profile 304. A comparison result 320 is then transmitted to voice-activated PDA 264.

Figure 7:
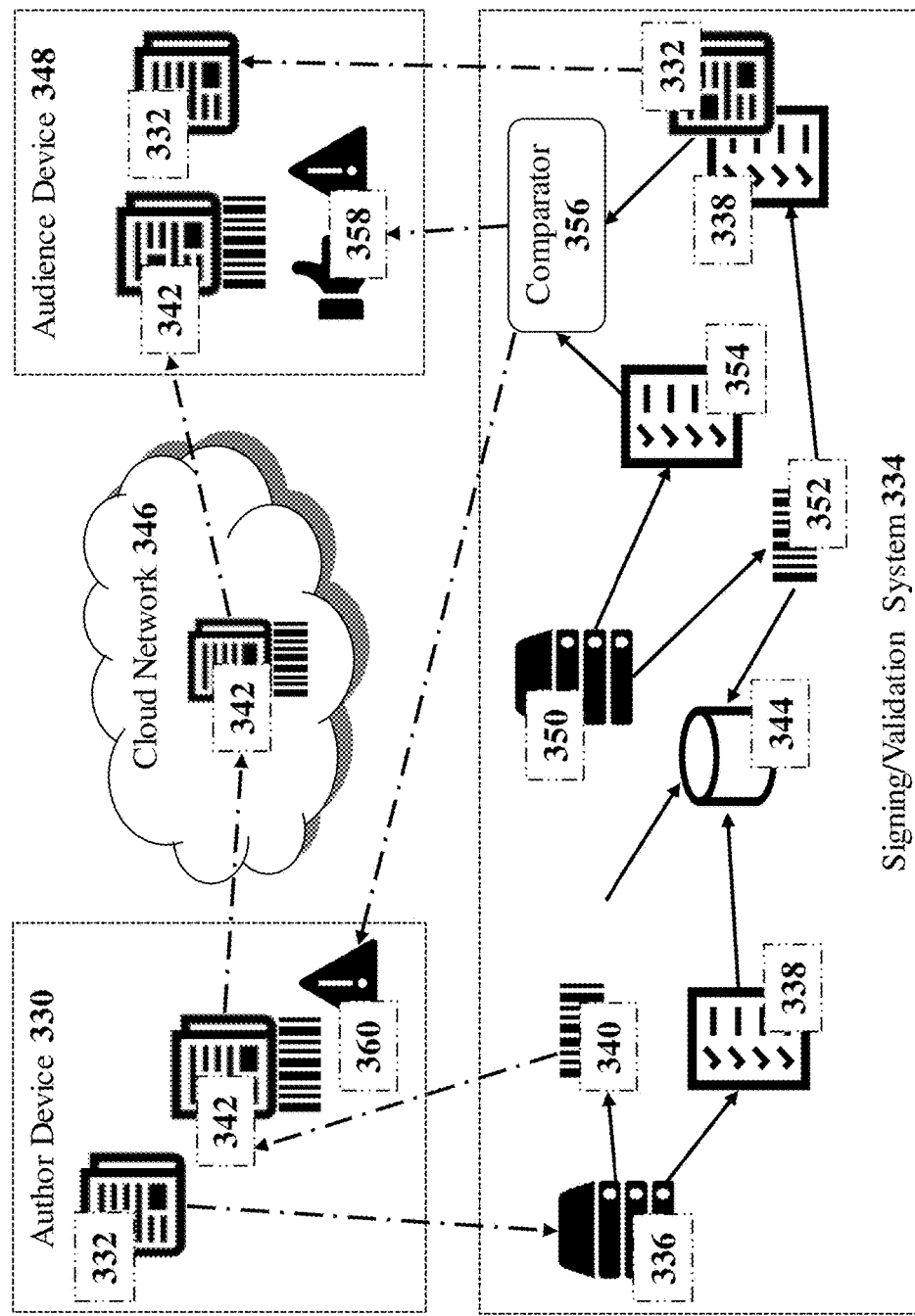
FIG. 7 is a simplified high-level schematic diagram of the system architecture for tagged-signal verification for uploading signed content, according to embodiments of the present invention.

FIG. 7 is a simplified high-level schematic diagram of the system architecture for tagged-signal verification for uploading signed content, according to embodiments of the present invention. A content author with an author device 330 wants to upload original content 332 (e.g., text, images, and audio/video clips) to a network server (e.g., a social network or publishing website). The content author wants to sign original content 332 to vouch for its authenticity. The expectation is that original content 332 may then be resent, reformatted, reshared, reprinted, and/or viewed by a large audience that accesses original content 332. The audience needs a simple a quick way to validate the content authenticity.

To sign original content 332, the content author uploads original content 332 through a signing/validation system 334 to a signing server 336. Signing server 336 produces analyzed content 338 (e.g., processes text or semantically analyzes images) from original content 332, and then adds an in-band digital signature 340 to original content 332 to produce signed content 342. For example, images and video clips may be signed with a visible QR code or barcode, while text content may be signed with a visible hash. Analyzed content 338 and in-band digital signature 340 are stored in a database 344. The content author can then upload signed content 342 to a cloud network 346 for others to access.

A content receiver (e.g., a person accessing an image through a private chat), as an example of the viewing audience accessing cloud network 346, may want to verify the authenticity of signed content 342 on his or her audience device 348. The content receiver uploads signed content 342 to a verification server 350 on signing/validation system 334. It is noted that verification server 350 can be the same server as signing server 336, performing both system functions. Verification server 350 extracts an extracted digital signature 352 from signed content 342, produces reanalyzed content 354, and compares extracted digital signature 352 to in-band digital signature 340 stored in database 344.

A comparator 356 responds by sending a notification 358 as either an authenticity confirmation or a "fake" alert to audience device 348. Signing/validation system 334 may optionally provide audience device 348 with the original content. Comparator 356 may optionally send an alert 360 to the content author that the original content was faked.

It is understood that the overall tagged-signal verification systems described herein may include its own integrated componentry (i.e., hardware, firmware, and/or software) for performing its prescribed functions. Thus, structural componentry such as processors, memory modules, instruction sets, and communication hardware and protocols are implicitly included in the description of the overall tagged-signal verification systems and their sub-systems described above.

Figure 8:
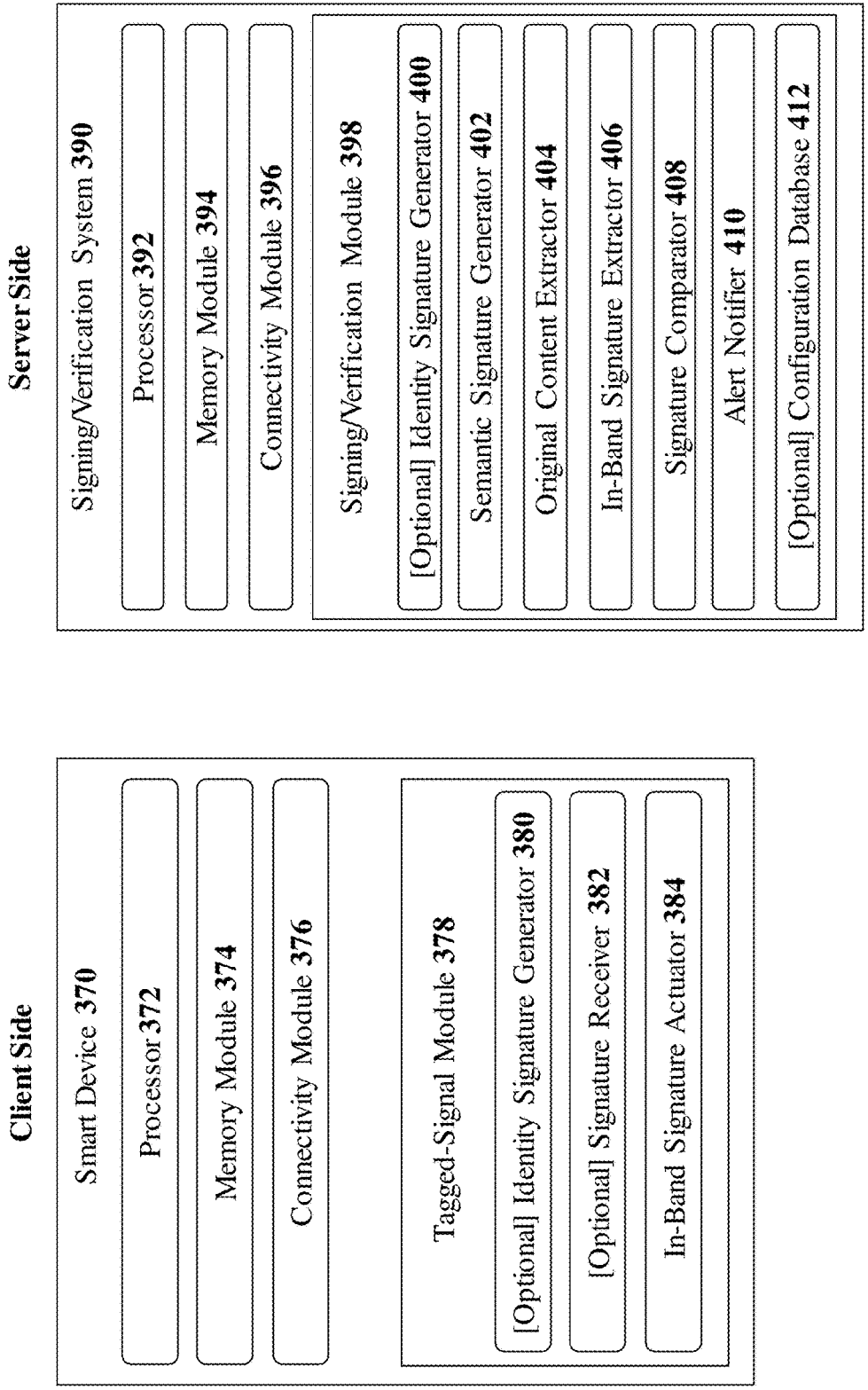
FIG. 8A is a simplified high-level block diagram of the general components on the client side of the tagged-signal verification systems of FIGS. 1-7 in a generic implementation applicable to all use cases, according to embodiments of the present invention.
FIG. 8B is a simplified high-level block diagram of the general components on the server side of the tagged-signal verification systems of FIGS. 1-7 in a generic implementation applicable to all use cases, according to embodiments of the present invention.

In implementation, the tagged-signal verification systems of FIGS. 1-7 include several components in order to perform the functional operations described above. FIG. 8A is a simplified high-level block diagram of the general components on the client side of the tagged-signal verification systems of FIGS. 1-7 in a generic implementation applicable to all use cases, according to embodiments of the present invention. Such components may be implemented as separate components or as integrated components performing several functional operations.

A smart device 370 is shown in FIG. 8A having a processor 372, a memory module 374, a connectivity module 376, and a tagged-signal module 378. On the "client" side of the system, smart device 370 needs to uniquely identify itself to the "server" side of the system; this may be accomplished in one of three ways. Firstly, the identity signature (e.g., a flashing LED sequence) can be transmitted by means of a supplementary active device by explicitly superposing the identity signature in the captured sensor input of the supplementary active device (e.g., images taken by a camera), as described above and exemplified in FIGS. 1 and 2.

Secondly, tagged-signal module 378 optionally includes an identity signature generator 380 for generating and storing its own ID (e.g., a GUID or client certificate) and expressed in the sequence signal. In implementation, identity signature generator 380 includes components for such aspects as authenticator key generation, time generation, and encryption, as described above and exemplified in FIGS. 3-6. Thirdly, tagged-signal module 378 optionally includes a signature receiver 382 for receiving its identity signature from the server side of the system through a secure channel established by connectivity module 376, as described above and exemplified in FIG. 7.

The identity signature (regardless of the means of its acquisition) is superposed by an in-band signature actuator 384 (also referred to above as supplementary active devices with regard to FIGS. 1 and 2) for producing the supplementary signal to be superposed on the content signal of smart device 370, resulting in a data stream containing an in-band signature as the tagged signal.

FIG. 8B is a simplified high-level block diagram of the general components on the server side of the tagged-signal verification systems of FIGS. 1-7 in a generic implementation applicable to all use cases, according to embodiments of the present invention. A signing/verification system 390 is shown having a processor 392, a memory module 394, a connectivity module 396, and a signing/verification module 398.

Signing/verification module 398 includes an optional identity signature generator 400, a semantic signature generator 402 for performing speech recognition, text conversion, and/or image analysis, an original content extractor 404, an in-band signature extractor 406, a signature comparator 408, an alert notifier 410, and an optional configuration database 412. Semantic signature generator 402 may optionally include functionality to transmit the signature, in conjunction with connectivity module 396, to in-band signature actuator 384 of FIG. 8A. In implementation, the components above include functionality for such aspects as filtering, signing, encryption/decryption, and hashing as described above.

Figure 9:
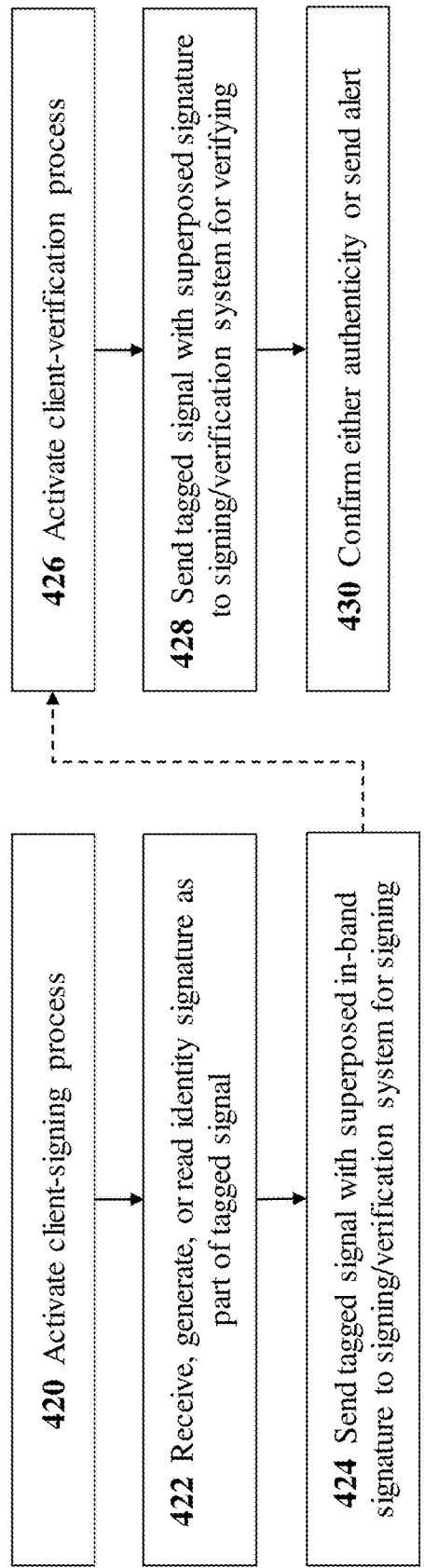
FIG. 9 is a simplified flowchart of the major process steps on the client side for the tagged-signal verification systems of FIGS. 1-7 in a generic implementation applicable to all use cases, according to embodiments of the present invention.

FIG. 9 is a simplified flowchart of the major process steps on the client side for the tagged-signal verification systems of FIGS. 1-7 in a generic implementation applicable to all use cases, according to embodiments of the present invention. Tagged-signal verification on the client side starts with activation of the client-signing process (Step 420) by receiving, generating, or reading identity signature as part of the tagged signal (Step 422), as described above with regard to FIG. 8A. The tagged signal is then sent with the superposed in-band signature to the signing/verification system for signing (Step 424).

Once the signing/verification system has signed the tagged signal, the client-verification process is activated (Step 426) by sending the tagged signal with the superposed signature to signing/verification system for verifying (Step 428). The genuineness of the tagged signal is finally confirmed by either indicating its authenticity or sending a "fake" alert (Step 430).

Figure 10:
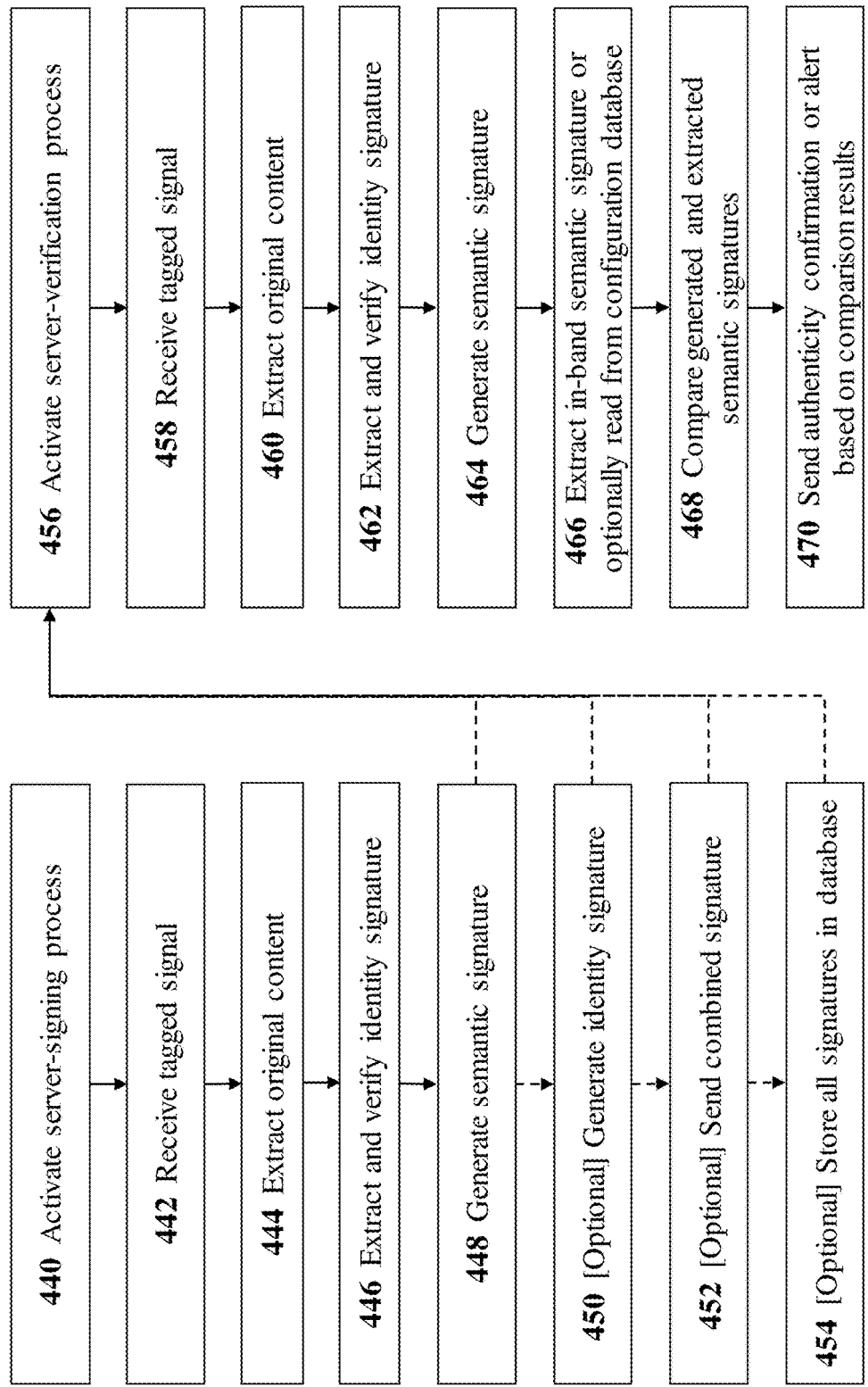
FIG. 10 is a simplified flowchart of the major process steps on the server side for the tagged-signal verification systems of FIGS. 1-7 in a generic implementation applicable to all use cases, according to embodiments of the present invention.

FIG. 10 is a simplified flowchart of the major process steps on the server side for the tagged-signal verification systems of FIGS. 1-7 in a generic implementation applicable to all use cases, according to embodiments of the present invention. Tagged-signal verification on the server side starts with activation of the server-signing process (Step 440) by receiving the tagged signal (i.e., the combined data stream of the original content with the identity signature) after the client-signing process (Step 442). The original content is extracted (Step 444), and then the identity signature is extracted and verified (Step 446). A semantic signature is generated (Step 448). Optionally, an identity signature is generated (Step 450), a combined signature is transmitted to the client device for subsequent superposition onto a new segment of the original content stream (Step 452), and all signatures are stored in a configuration database (either locally or remotely) for subsequent verification (Step 454).

The server-verification process is activated (Step 456) by receiving the tagged signal from the client device (Step 458). The original content is extracted (Step 460), and then the identity signature is extracted and verified (Step 462). A semantic signature is generated (Step 464). The in-band semantic signature is extracted, or optionally read from a configuration database (Step 466). The generated and extracted semantic signatures are then compared (Step 468). The signing/verification system finally sends an authenticity confirmation or "fake" alert based on the comparison results (Step 470).

It is noted that implementations of the present invention can be employed in which the functions of the tagged-signal verification are primarily performed on a single device. In such embodiments, the client-server model is reduced to the functionality described with regard to the server side (FIGS. 8B and 10), with the signing/verification system also performing the tasks of the client side (FIGS. 8A and 9), as the operative implementation (e.g., on a single smart device/system). In such implementations, the intended sending and receiving devices of the content are only using the tagged-signal verification system as a remote service through an interface application.

While the present invention has been described with respect to a limited number of embodiments, it will be appreciated that many variations, modifications, and other applications of the present invention may be made.

What is claimed is:

1. A method for tagged-signal verification, the method comprising the steps of:
   (a) upon obtaining original content to be transmitted to a recipient device in verified form, generating an original identity signature for said original content;
   (b) generating an original semantic signature for said original content;
   (c) superposing said original identity signature on said original content as an in-band digital watermark;
   (d) utilizing said original semantic signature either by:
      (i) superposing said original semantic signature on said original content as part of said in-band digital watermark; or
      (ii) storing said original semantic signature for verification;
   (e) transmitting a tagged signal, wherein said tagged signal is a combined signal of said in-band digital watermark and said original content;
   (f) upon receiving said tagged signal from said recipient device with a verification request, extracting transmitted content from said tagged signal;
   (g) extracting said in-band digital watermark from said tagged signal to retrieve a transmitted identity signature;
   (h) determining whether said transmitted identity signature is valid by comparing said transmitted identity signature to said original identity signature;
   (i) obtaining said original semantic signature either by:
      (i) extracting said original semantic signature from said in-band digital watermark; or
      (ii) retrieving a stored version of said original semantic signature;
   (j) generating a transmitted semantic signature from said transmitted content;
   (k) verifying whether said transmitted semantic signature is identical to said original semantic signature;
   (l) determining whether said transmitted content is tamper-free and identical to said original content, or has been manipulated based on said step of verifying; and
   (m) transmitting a confirmation notification to said recipient device, wherein said confirmation notification is adapted to:
      (i) vouch for the authenticity of said transmitted content as a genuine version of said original content; or
      (ii) designate said transmitted content as a tampered version of said original content.

2. The method of claim 1, wherein said step of superposing is performed by at least one in-band signature actuator configured to emit said in-band digital watermark as at least one specific identifiable sequence.

3. The method of claim 2, wherein said at least one in-band signature actuator is at least one item selected from the group consisting of: a light emitter, a loud speaker, a vibrating component, a controllable motion component, a sequence-displaying device, and a sensor-detectable sequence generator, and wherein said at least one specific identifiable sequence is at least one item selected from the group consisting of: a sequenced flashing light, a sequenced color-changing light, a sequenced audio signal, a sequenced vibration pattern, and a sequenced motion pattern.

4. The method of claim 1, wherein said semantic signature is based on a speech recognition, a text conversion, an image analysis, an audio analysis, and/or a pattern analysis on said original content.

5. A system for tagged-signal verification, the system comprising:
(a) a CPU for performing computational operations;
(b) a memory module for storing data;
(c) a network connection for communicating across a network; and
(d) a signing/verification module configured for signing and verifying original content to be transmitted to a recipient device in verified form, said signing/verification module including:
(i) an identity signature generator configured for:
(A) generating an original identity signature for said original content; and
(B) superposing said original identity signature on said original content as an in-band digital watermark;
(ii) a semantic signature generator configured for:
(A) generating an original semantic signature for said original content; and
(B) utilizing said original semantic signature either by:
(I) superposing said original semantic signature on said original content as part of said in-band digital watermark; or
(II) storing said original semantic signature by said memory module for verification;
(iii) an original content extractor configured for, upon receiving a tagged signal from said recipient device with a verification request, extracting transmitted content from said tagged signal, wherein said tagged signal is a combined signal of said in-band digital watermark and said original content, and wherein said tagged signal is transmitted by said network connection;
(iv) an in-band signature extractor configured for:
(A) extracting said in-band digital watermark from said tagged signal to retrieve a transmitted identity signature; and/or
(B) extracting said original semantic signature from said in-band digital watermark;
(v) a signature comparator configured for:
(A) determining whether said transmitted identity signature is valid by comparing said transmitted identity signature to said original identity signature;
(B) obtaining said original semantic signature either by extracting by said in-band signature extractor or by retrieving a stored version from said memory module;
(C) verifying whether a transmitted semantic signature is identical to said original semantic signature, wherein said transmitted semantic signature is generated from said transmitted content by said semantic signature generator; and (D) determining whether said transmitted content is tamper-free and identical to said original content, or has been manipulated based on said verifying; and
(vi) an alert notifier configured for transmitting, via said network connection, a confirmation notification to said recipient device, wherein said confirmation notification is adapted to:
(A) vouch for the authenticity of said transmitted content as a genuine version of said original content; or
(B) designate said transmitted content as a tampered version of said original content.

6. The system of claim 5, the system further comprising:
(vii) at least one in-band signature actuator configured for performing said superposing by emitting said in-band digital watermark as at least one specific identifiable sequence.

7. The system of claim 6, wherein said at least one in-band signature actuator is at least one item selected from the group consisting of: a light emitter, a loudspeaker, a vibrating component, a controllable motion component, a sequence-displaying device, and a sensor-detectable sequence generator, and wherein said at least one specific identifiable sequence is at least one item selected from the group consisting of: a sequenced flashing light, a sequenced color-changing light, a sequenced audio signal, a sequenced vibration pattern, and a sequenced motion pattern.

8. The system of claim 5, wherein said memory module includes a configuration storage unit for storing configuration data, user profile data, and/or signature data.

9. The system of claim 5, wherein said network connection includes at least one secure channel for restricted secure communication.

10. The system of claim 5, wherein said identity signature generator includes functionality for performing encryption, decryption, and/or hashing.

11. The system of claim 5, wherein said semantic signature generator includes functionality for performing encryption, decryption, hashing, speech recognition, text conversion, image analysis, audio analysis, and/or pattern analysis on said original content.

12. A non-transitory computer-readable storage medium, having computer-readable code embodied on the non-transitory computer-readable storage medium, for tagged-signal verification, the computer-readable code comprising:
(a) program code for, upon obtaining original content to be transmitted to a recipient device in verified form, generating an original identity signature for said original content;
(b) program code for generating an original semantic signature for said original content;
(c) program code for superposing said original identity signature on said original content as an in-band digital watermark;
(d) program code for utilizing said original semantic signature either by:
(i) superposing said original semantic signature on said original content as part of said in-band digital watermark; or
(ii) storing said original semantic signature for verification;
(e) program code for transmitting a tagged signal, wherein said tagged signal is a combined signal of said in-band digital watermark and said original content;

(f) program code for, upon receiving said tagged signal from said recipient device with a verification request, extracting transmitted content from said tagged signal;
(g) program code for extracting said in-band digital watermark from said tagged signal to retrieve a transmitted identity signature;
(h) program code for determining whether said transmitted identity signature is valid by comparing said transmitted identity signature to said original identity signature;
(i) program code for obtaining said original semantic signature either by:
  (i) extracting said original semantic signature from said in-band digital watermark; or
  (ii) retrieving a stored version of said original semantic signature;
(j) program code for generating a transmitted semantic signature from said transmitted content;
(k) program code for verifying whether said transmitted semantic signature is identical to said original semantic signature;
(l) program code for determining whether said transmitted content is tamper-free and identical to said original content, or has been manipulated based on said verifying; and
(m) program code for transmitting a confirmation notification to said recipient device, wherein said confirmation notification is adapted to:
  (i) vouch for the authenticity of said transmitted content as a genuine version of said original content; or
  (ii) designate said transmitted content as a tampered version of said original content.

13. The non-transitory computer-readable storage medium of claim 12, wherein said superposing is performed by at least one in-band signature actuator configured to emit said in-band digital watermark as at least one specific identifiable sequence.

14. The non-transitory computer-readable storage medium of claim 13, wherein said at least one in-band signature actuator is at least one item selected from the group consisting of: a light emitter, a loudspeaker, a vibrating component, a controllable motion component, a sequence-displaying device, and a sensor-detectable sequence generator, and wherein said at least one specific identifiable sequence is at least one item selected from the group consisting of: a sequenced flashing light, a sequenced color-changing light, a sequenced audio signal, a sequenced vibration pattern, and a sequenced motion pattern.

15. The non-transitory computer-readable storage medium of claim 12, wherein said semantic signature is based on a speech recognition, a text conversion, an image analysis, an audio analysis, and/or a pattern analysis on said original content.

* * * * *